United States Patent [19]

Nishikawa et al.

[11] 4,379,865

[45] Apr. 12, 1983

[54] BINDER FOR CASTING SAND AND RESIN-COATED GRAINS OF SAND

[75] Inventors: Kazuyuki Nishikawa, Toyohashi; Katsumi Hirao, Akashi, both of Japan

[73] Assignees: Daicel Chemical Industries, Ltd., Osaka; Shinto Kogio, Ltd., Nagoya, both of Japan

[21] Appl. No.: 227,875

[22] Filed: Jan. 23, 1981

[30] Foreign Application Priority Data

Feb. 1, 1980 [JP] Japan .................................. 55-11322

[51] Int. Cl.³ .................. B22C 1/00; B22C 11/22; C08G 12/00; C08G 12/12
[52] U.S. Cl. .................................. 523/139; 523/142; 527/309
[58] Field of Search ............. 260/15, 39 SB, DIG. 40; 106/196, 193 J; 523/139, 142; 527/309; 525/54.21

[56] References Cited

U.S. PATENT DOCUMENTS

| | | | |
|---|---|---|---|
| 1,942,583 | 1/1934 | Walter | 106/193 J |
| 2,375,838 | 5/1945 | Coolidge et al. | 527/309 |
| 2,473,463 | 6/1949 | Adams | 260/15 |
| 2,476,127 | 7/1949 | West | 260/39 SB |
| 2,966,422 | 12/1960 | Brandner | 106/196 |
| 3,491,037 | 1/1970 | Keys et al. | 260/21 |

*Primary Examiner*—Theodore Morris
*Attorney, Agent, or Firm*—Flynn, Thiel, Boutell & Tanis

[57] ABSTRACT

A binder for casting sand of the present invention comprises 5–95 wt. % of cellulose acetate and 5–95 wt. % of a thermosetting resin precondensate such as an alkylated methylolmelamine, alkylated methylolurea or a mixture of them, and it is used particularly for the casting carried out at a relatively low casting temperature. Up to about 50% of cellulose acetate may be replaced with an acetate of an aliphatic polyhydric alcohol or an alkyl phthalate. In the resin-coated grains of sand of the present invention, the grains of sand are coated with a binder comprising 5–95 wt. % of cellulose acetate and 5–95 wt. % of a thermosetting resin precondensate.

7 Claims, No Drawings

BINDER FOR CASTING SAND AND RESIN-COATED GRAINS OF SAND

BACKGROUND OF THE INVENTION

The present invention relates to a binder for sand for sand casting molds and to resin-coated grains of sand. More particularly, the present invention relates to a binder for molds used in casting carried out at a relatively low temperature to form aluminum castings, etc., among other things, core molds, and resin-coated grains of sand.

In the production of castings having empty spaces of complicated shapes or undercuts, in the prior art there have been used cores which can be disintegrated or dissolved after the casting and the cores are removed by disintegration or dissolution thereof after the casting. In the production of such molds, sand coated with a thermosetting resin such as phenol-formaldehyde resin is generally used. However, in case the casting temperature is low as in the casting of an aluminum alloy, the integratability is insufficient. On the other hand, the use of a core soluble in water necessitates a measure to counter environmental pollution due to the waste water.

Under the circumstances as described above, coated grains of sand having strength and capacities equivalent to those of conventional coated grains of sand and excellent disintegrating properties have been demanded for casting a core used for low temperature casting.

After intensive investigations, the inventors have found that grains of sand coated with a binder comprising cellulose acetate and a specific thermosetting resin precondensate have excellent properties for the preparation of cores for low-temperature casting. The present invention has been attained on the basis of this finding.

DETAILED DESCRIPTION OF THE PREFERRED EMBODIMENTS

The present invention relates to a binder for casting sand which comprises 5–95 wt. % of cellulose acetate and 5–95 wt. % of a thermosetting resin precondensate, and to resin-coated grains of sand which are coated with said binder for casting sand.

When cellulose acetate which is a thermoplastic resin is used as a binder, a sand comprising grains coated therewith can be obtained, which sand brings about sufficient molding properties in the molding in a short period of time, an excellent surface condition of cores, a sufficient practical tensile strength and excellent disintegrating properties. If the amount of cellulose acetate is less than 5% based on the binder, the molding properties of forming the molding in a short period of time and the surface condition properties are insufficient. If the amount of cellulose acetate is more than 95%, the tensile strength is apt to be insufficient. A suitable cellulose acetate used in the present invention is one soluble in acetone. Namely, it has an acetylation degree of suitably 48–57%. The acetylation degree is defined as acetic acid content. The cellulose acetate has preferably a relatively low polymerization degree from the viewpoint of fluidity obtained when it is molten. However, an insufficient polymerization degree causes a reduction in tensile strength of the cast cores. Therefore, cellulose acetate having a limiting viscosity number of 0.15–2.2 (acetone solution, 25° C.) is suitable.

It is also effective for improving molding properties and the surface condition to incorporate a plasticizer for cellulose acetate in the cellulose acetate. As the plasticizers for cellulose acetate, there may be used acetates of aliphatic polyhydric alcohols, such as ethylene glycol, propylene glycol, butylene glycol and glycerine, and alkyl ($C_1$–$C_3$) phthalates.

The amount of the plasticizer is such that up to a half of the cellulose acetate may be replaced therewith. If the plasticizer is used in an excess amount, the tensile strength of the binder is reduced and a white smoke is emitted during heating in the molding step.

As the thermosetting resin precondensates, there may by used suitably acetone-soluble alkylated methylolmelamines, alkylated methylolureas and mixtures thereof. The alkyl group of these compounds contains one to four atoms, methyl, ethyl, propyl, isopropyl and butyl, preferably methyl. As compared with phenol-formalin resins used for coating grains of sand in the prior art, such precondensates are superior with respect to disintegrating properties and the smell emitted in the molding step is less in the latter. The precondensates according to the present invention have high compatibility with cellulose acetate and, therefore, a sufficient tensile strength can be obtained by using the combination thereof.

The following examples further illustrate the present invention, in which parts are given by weight.

EXAMPLE 1

Ten parts of cellulose acetate (acetylation degree 56.5%, limiting viscosity number 0.18) and 20 parts of methylated methylolmelamine were thoroughly stirred together with about 50 parts of acetone at ambient temperature to obtain a binder solution. 1000 parts of silica sand (Flattery sand of Australia) were added to the solution and the whole was kneaded while warm air of about 50° C. was introduced therein to evaporate acetone, thereby obtaining resin-coated grains of sand. Then, the sand was kneaded together with 1 part of calcium stearate and the mixture was sieved to collect the grains which passed a 20-mesh sieve. A coated sand sample was thus obtained.

The sample thus obtained was used for the molding, and breaking resistances of the test pieces were measured according to the specification of JIS K 6910 "Test method for powdery resin for shell molds". The temperatures of the molds were 250°±10° C. and 280°±10° C. and heating times were one minute in the molding step. The molded test pieces were wrapped in an aluminum foil with both ends of each piece protruding out from the wrapping. They were kept in a heating furnace at a given temperature for a given period of time and then allowed to cool to room temperature. Thereafter, residual breaking resistances were measured to determine the disintegrating properties.

The results are shown in Table 1.

EXAMPLE 2

Coated grains of sand were obtained in the same manner as in Example 1 except that a mixture of 13 parts of cellulose acetate (acetylation degree 52.1%, limiting viscosity number 0.36), 5 parts of glycerol triacetate, 6 parts of methylated methylolmelamine and 6 parts of methylated methylolurea was used. Breaking resistances and high-temperature disintegrating properties of molded sample pieces were measured.

EXAMPLE 3

The same procedures as in Example 1 were repeated except that 6 parts of cellulose acetate (acetylation degree 56.0%, limiting viscosity number 0.80) and 24 parts of methylated methylolmelamine were used.

EXAMPLE 4

The same procedures as in Example 1 were repeated except that 18 parts of cellulose acetate (acetylation degree 56.0%, limiting viscosity number 0.48), 6 parts of triethyleneglycol diacetate and 6 parts of methylated methylolmelamine were used.

COMPARATIVE EXAMPLES 1–2

Breaking resistances and disintegrating properties of commercially available resin-coated grains of sand (shell sand) coated with phenol-formalin resin and commercially available coated grains of sand of improved disintegration type were measured in the same manner as above.

The results of the measurement in Examples 1–4 and Comparative Examples 1–2 are shown in Table 1.

TABLE 1

|  |  | Ex. 1 | Ex. 2 | Ex. 3 | Ex. 4 | Comp. Ex. 1 (Commercially available sand) | Comp. Ex. 2 (Commercially available sand of improved type) |
|---|---|---|---|---|---|---|---|
| Breaking resistance kg/cm² | Molding 250° C. | 40.7 | 30.9 | 34.1 | 28.3 | 24.8 | 24.5 |
|  | Molding 280° C. | 35.9 | 24.9 | 28.1 | 29.9 | 28.6 | 28.1 |
| Disintegrating properties | 360° C. 5 mins. | 8.6 | 3.9 | 2.3 | 3.4 | 18.0 | 15.4 |
|  | 360° C. 10 mins. | 0.9 | 1.1 | 0.8 | 2.3 | 13.1 | 15.8 |

The breaking resistances and molding properties of the samples in Examples 1–4 were not inferior to those of the commercial sands and the former had excellent surface conditions. As for the disintegrating properties, quite excellent results were obtained.

What is claimed is:

1. A composition consisting essentially of a mixture of approximately 43 to 60 wt. % of cellulose acetate which is soluble in acetone, has an acetylation degree of from 48 to 57% and has a limiting viscosity number of from 0.15 to 2.2 measured in an acetone solution thereof at 25° C., from 17 to 20 wt. % of a plasticizer for said cellulose acetate, and from 20 to 40 wt. % of a thermosetting resin precondensate selected from the group consisting of acetone-soluble alkylated methylolmelamines, acetone-soluble alkylated methylolureas and mixtures thereof.

2. A composition consisting essentially of a mixture of from 20 to 33 wt. % of cellulose acetate which is soluble in acetone, has an acetylation degree of from 48 to 57% and has a limiting viscosity number of from 0.15 to 2.2 measured in an acetone solution thereof at 25° C., and from 67 to 80 wt. % of a thermosetting resin precondensate selected from the group consisting of acetone-soluble alkylated methylolmelamines, acetone-soluble alkylated methylolureas and mixtures thereof.

3. A composition according to claim 1 in which said plasticizer is selected from the group consisting of acetates of aliphatic polyhydric alcohols and alkyl ($C_1$–$C_3$) phthalates.

4. Grains of sand coated with an effective binder amount of a binder composition consisting essentially of a mixture of
   A. from 5 to 95 wt. % of a component selected from the group consisting of (1) cellulose acetate which is soluble in acetone, has an acetylation degree of from 48 to 57% and has a limiting viscosity number of from 0.15 to 2.2 measured in an acetone solution thereof at 25° C., and (2) a mixture of said cellulose acetate and up to 50%, based on the weight of component A, of a plasticizer for said cellulose acetate, and
   B. from 95 to 5 wt. % of a thermosetting resin precondensate selected from the group consisting of acetone-soluble alkylated methylolmelamines, acetone-soluble alkylated methylolureas and mixtures thereof.

5. Grains of sand according to claim 4 in which said plasticizer is selected from the group consisting of acetates of aliphatic polyhydric alcohols and alkyl ($C_1$–$C_3$) phthalates.

6. Grains of sand according to claim 4 in which said binder composition contains from 20 to 80 wt. % by weight of component A and from 80 to 20 wt. % of component B.

7. A sand mold for metal casting, said mold being made of grains of sand as claimed in claim 4.

* * * * *